INVENTOR
GEORGE THOMAS ENNIS

BY Lyons, Buch, Swindler & McKie

ATTORNEYS

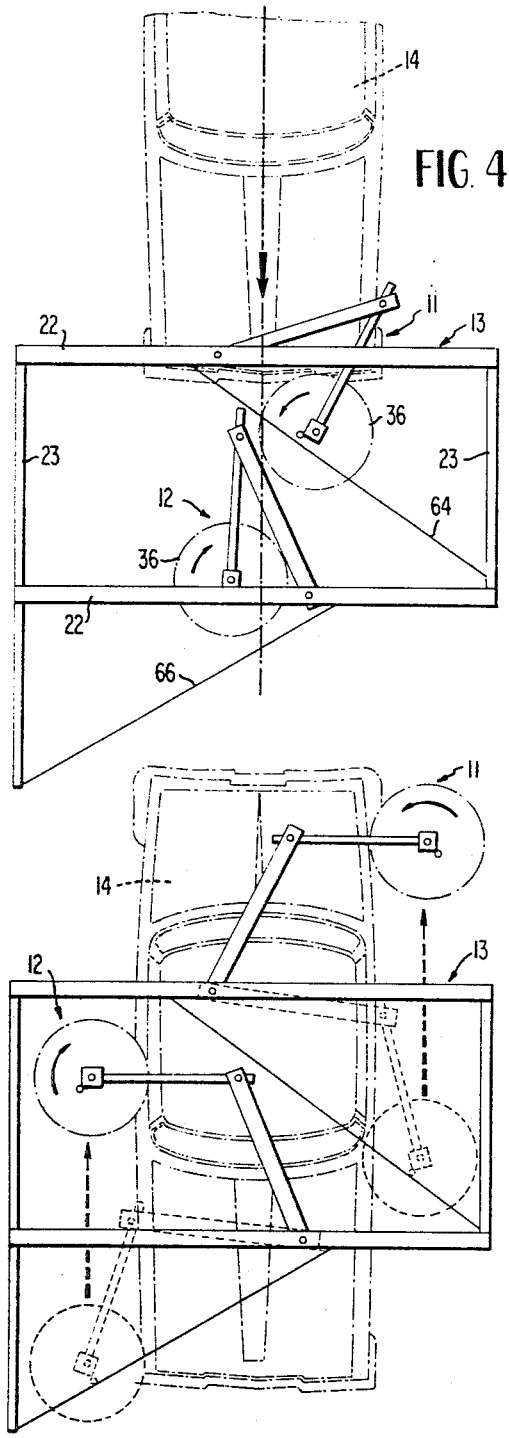
FIG. 4a
FIG. 4b
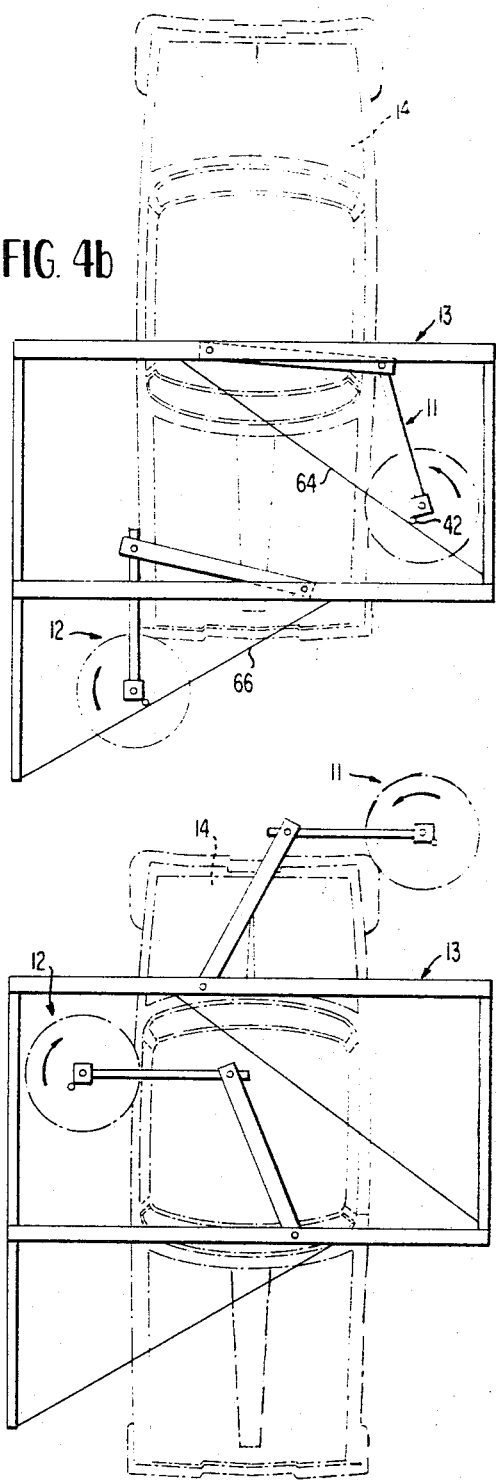
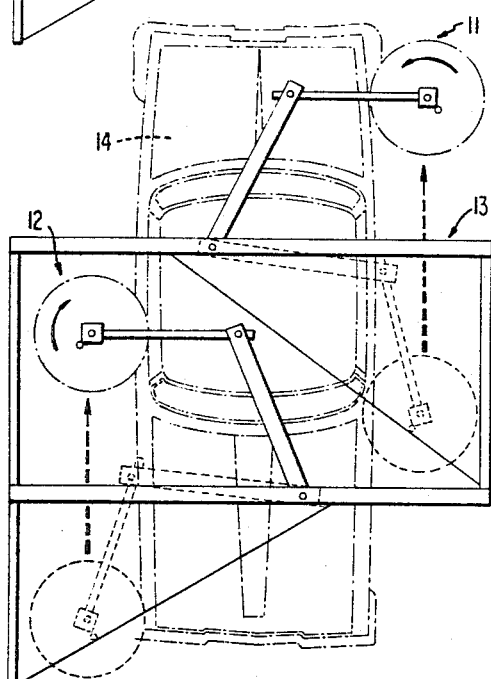
FIG. 4c
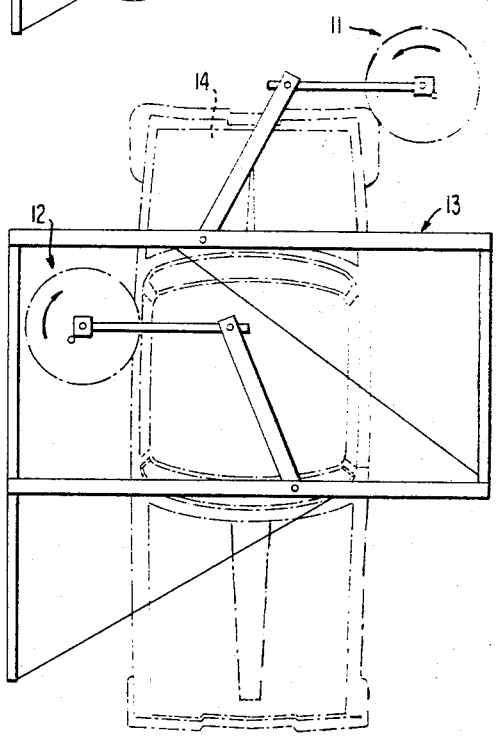
FIG. 4d

United States Patent Office 3,471,883
Patented Oct. 14, 1969

3,471,883
VEHICLE WASHING APPARATUS
George Thomas Ennis, 1354 E. State St.,
Sharon, Pa. 16146
Filed May 7, 1968, Ser. No. 727,213
Int. Cl. B60s 3/06
U.S. Cl. 15—21   9 Claims

ABSTRACT OF THE DISCLOSURE

A vehicle wrap around type brushing cleaning unit comprised of a first arm pivoted at one end to an overhead frame structure inside a predetermined path of a vehicle to be washed and having a second arm pivoted thereto carrying a rotary brush and a motor means for driving the brush at one end. The two arms normally are maintained in a closed position overhead by a weight tensioning means and a spring tensioning means to initially position the brush in the center of the path. A guide means attached to the frame structure is located ahead of the brush for contact therewith to facilitate movement of the brush around the front corner of a vehicle. When contacted and pushed forwardly by a vehicle the brush moves across the front, along the side and across the back of the vehicle. Two such units may be used to wash both sides of the vehicle.

BACKGROUND OF THE INVENTION

This invention relates to a device for washing a vehicle such as an automobile. More particularly, the invention relates to such a device for washing a vehicle which includes a rotatably mounted brush for washing the front, sides, and back of a car.

In the past, there have been numerous devices available for washing vehicles, particularly automobiles. Such prior known devices have been objectionable in that they have been complicated in construction requiring the use of several rotary brushes to effect a satisfactory cleaning of all sides of a vehicle. Such devices often have required close supervision by operating personnel to assure proper positioning and manipulation of the brushes to wash all parts of a vehicle. Consequently, such devices have been expensive to construct as well as to operate and maintain. Furthermore, other such prior known devices have not provided satisfactory cleaning of a vehicle. The brushes of other of such prior art devices also have had a tendency to snag or catch on a vehicle, thus causing considerable damage.

Accordingly, it is an object of the instant invention to provide a vehicle washing device which overcomes the disadvantages enumerated above.

SUMMARY OF THE INVENTION

The invention relates to a vehicle washing device of the wrap around type wherein one brush is capable of washing the front, one side, and the back of a vehicle. The device includes supporting frame means extending over a predetermined path of a vehicle to be washed. A first overhead arm is pivotally mounted at one end to the frame means at a point overhead inside the path of the vehicle. A second overhead arm pivotally connected to the first arm carries a rotatable brush and a motor means for driving the brush at one end. Biasing or tensioning means normally maintain both arms in a closed position overhead inside the path to initially locate the brush in the center of the path to be contacted by a vehicle to be washed. The biasing or tensioning means comprises a first weight tensioning means connected to the first arm and the frame means and a second spring tensioning means connected between the first arm and the second arm. The arms are movable from the closed to an open position as the brush is contacted and moved forwardly by the vehicle to allow the brush to move across the front, along the side and across the back of the vehicle. Guide means are located in the path ahead of the brush and connected to the frame means for contact by the brush unit as the brush is moved forward to facilitate movement of the brush around the front corner of the vehicle.

Two such brush units as just described are normally provided for each vehicle washing installation so that the first brush unit cleans half of the front, one side, and half of the back end of the vehicle while the second brush unit cleans the other half of the front, the opposite side, and the other half of the back end of the vehicle. The brush is rotated in a direction such that the reaction force between the brush and the vehicle tends to move the brush around the vehicle in the proper direction. The brush of the second unit is thus rotated in the opposite direction from the brush of the first unit to facilitate movement of the brushes in opposite directions around the vehicle.

The above-described device has the advantage of simplicity since no operators are required to positively move the brush to clean the sides as well as the front and back of a vehicle. The only means necessary are the tensioning means which tend to bias the arms toward their closed position and consequently, maintain the brush in engagement with the vehicle. All that is necessary to operate the unit is to move the vehicle with respect to the brush whereupon the brush will automatically move around the front, along the side, and across the back of the vehicle. The instant washing device is further advantageous in that the first arm is pivoted to the frame structure overhead at a point inside the path of the vehicle rather than being pivoted at the side of the path. This permits the brush to remain in contact with the front of a vehicle for a longer period of time after the brush is initially contacted, therefore, resulting in a more efficient cleaning of the front of the vehicle. Similarly, better contact is maintained with the rear or back of the vehicle after the brush moves around the side to the back of the vehicle.

Another advantage resides in the fact that guide means in the form of a cable or the like are attached to the frame means at a point overhead in the path ahead of the brush when the brush is in its normal position. Consequently, as the brush is moved forwardly and outwardly, after being contacted by a vehicle, the brush mounting means at the end of the second arm comes in contact with the guide means to facilitate movement of the brush around the front corner of the vehicle. Snagging of the brush by the corner of the vehicle adjacent the head light portion is therefore virtually eliminated. Still another advantage results from the use of two tensioning or biasing means to normally maintain the arms in their closed position. The two tensioning means operate quickly and effectively to maintain the brush in contact with the vehicle at all times as the vehicle is moved through the vehicle washing device.

Other objects, advantages, and aspects of the invention will become apparent by reference to the more detailed description and drawings which follow.

BRIEF DESCRIPTION OF THE DRAWINGS

The invention having been broadly described a specific embodiment thereof will now be set forth in detail with reference to the accompanying drawings in which:

FIGS. 4a through 4f are schematic top plan views of the vehicle washing device of FIG. 1 illustrating the various positions of the brushes as the vehicle is being washed during its passage through the device.

DESCRIPTION OF THE INVENTION

Figures 1, 5:
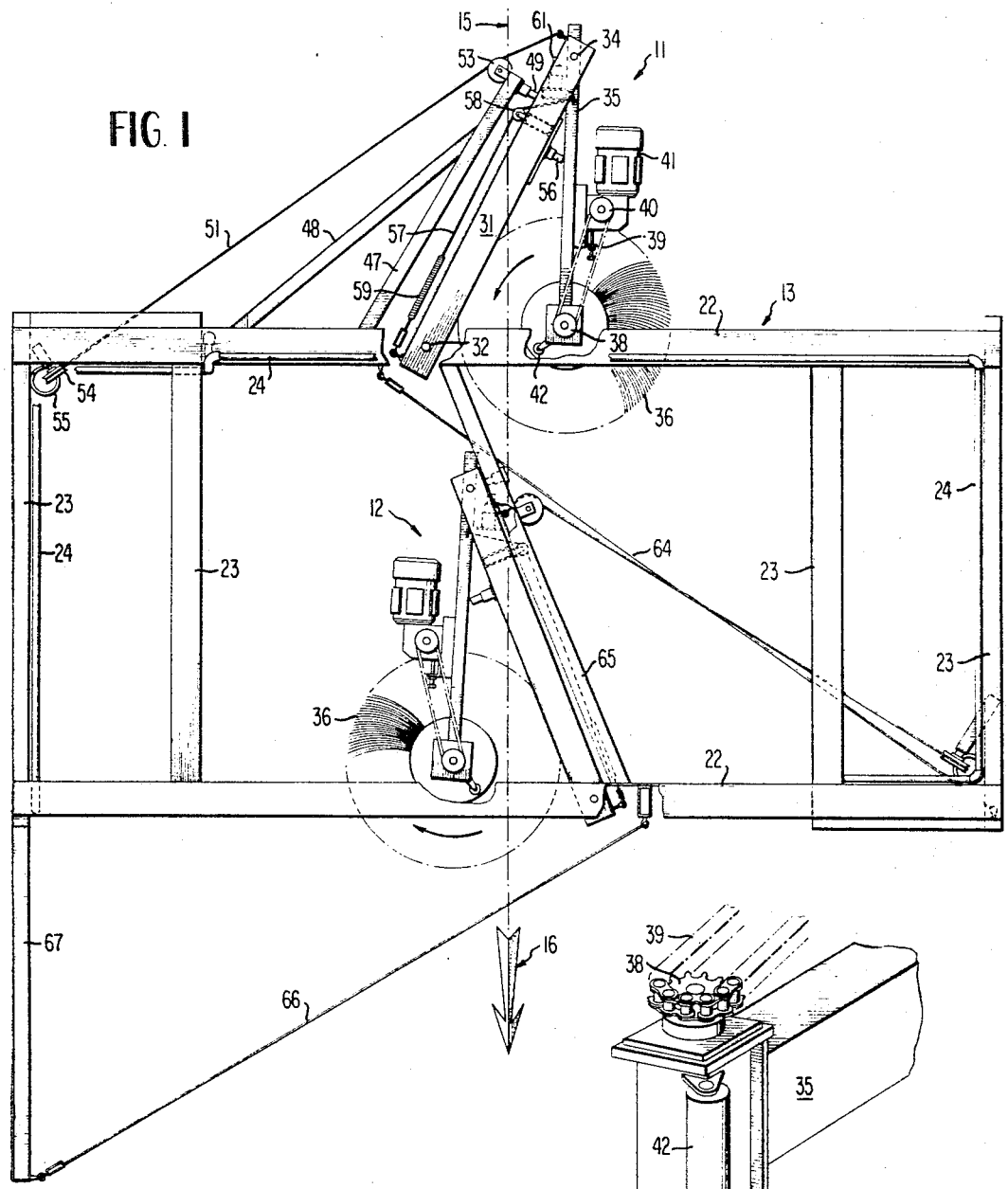
FIG. 1 is a top plan view of a vehicle washing device according to the invention showing the use of two brush units.
FIG. 5 is an enlarged perspective view showing a portion of the end of the brush carrying arm and illustrating the chain drive for rotating the brush and the roller which contacts the guide means.
Figure 2:
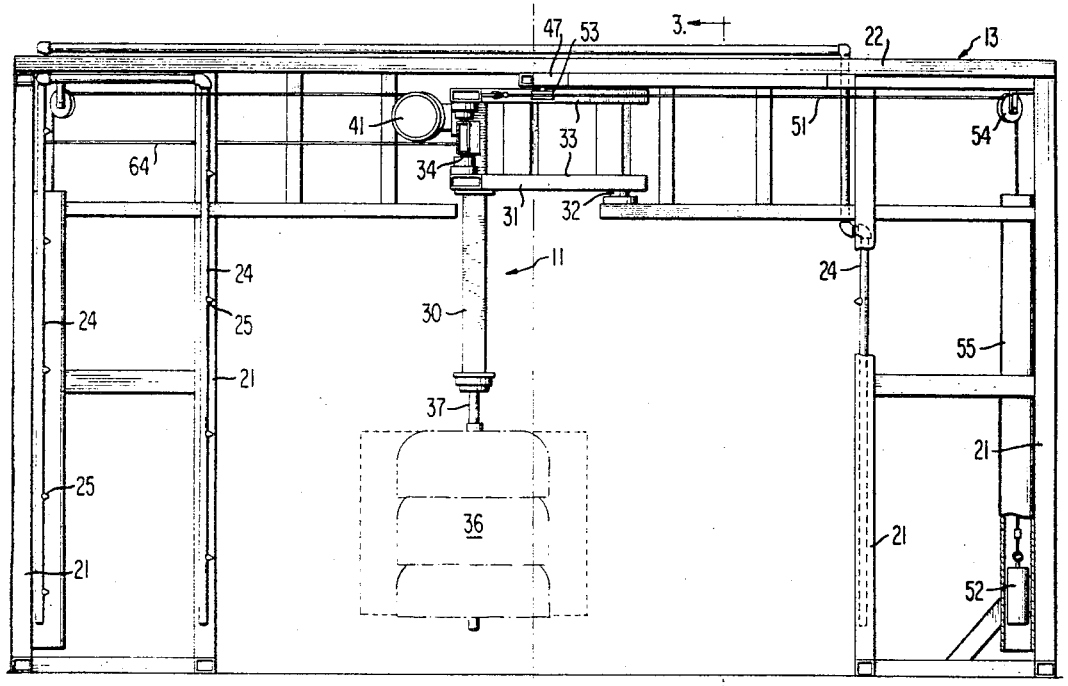
FIG. 2 is an end elevation view of the vehicle washing device shown in FIG. 1.
Figure 3:
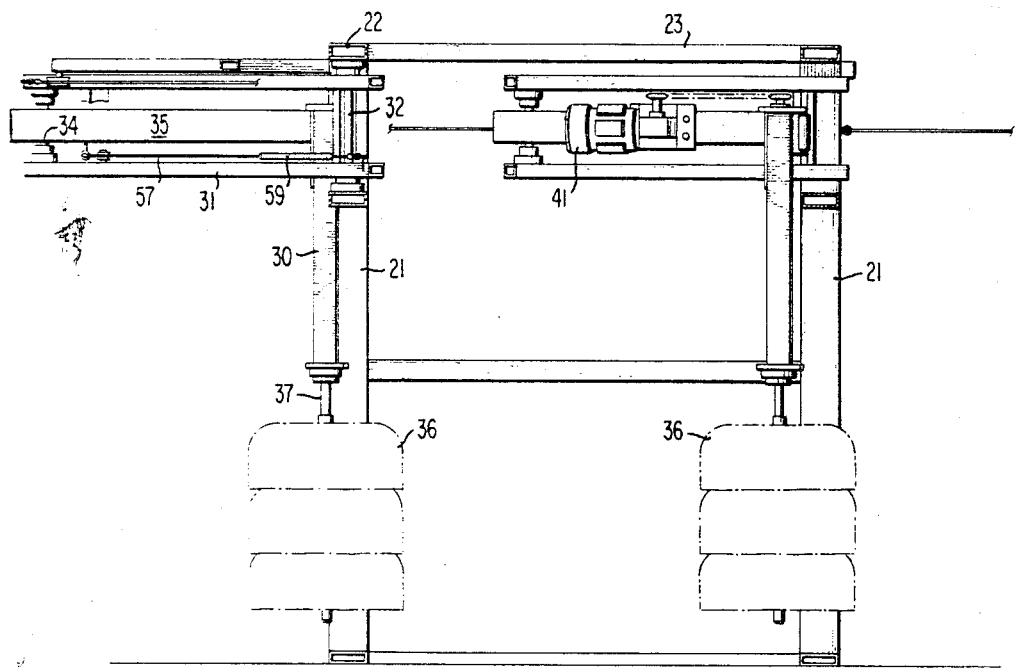
FIG. 3 is a side elevation view of the vehicle washing device taken along line 3—3 of FIG. 2.

Illustrated in FIGURES 1-5 of the drawings is a preferred embodiment of a vehicle washing apparatus according to the present invention comprised of a pair of vehicle brushing units 11 and 12 mounted on a supporting frame means, generally indicated by the numeral 13, extending over a predetermined path of a vehicle 14 to be washed. The path of the vehicle is generally indicated by the center line 15 and arrow 16 in FIGURE 1, with the center line 15 indicating the center of the path as well as the center of the entire vehicle washing apparatus.

The first brushing unit 11 is adapted to brush the left half of the front end, the entire left side and the left half of the back end of the vehicle while the second brushing unit 12 is adapted to brush the right half of the front end, the entire right side and the right half of the back end of the vehicle as the vehicle is moved through the vehicle washing apparatus along the path as shown in FIGURES 4a through 4f. The vehicle 14 preferably is advanced through the vehicle washing apparatus in the direction of arrow 16 by means of any conventional conveying device installed at the bottom or base of the apparatus for connection to the vehicle. A conveying device is not illustrated in the drawings since any well-known and conventional conveying apparatus may be employed.

The frame means for the brush units 11 and 12 includes vertical frame members 21 on each side of the path connected at the top by horizontal frame members 22 extending across the path and horizontal frame members 23 extending parallel to the path. Mounted on the frame members are a plurality of pipes 24 having a plurality of spray outlets 25 on both sides of the path of spray washing and cleansing liquids on the vehicle during its passage through the washing apparatus.

The vehicle brushing units 11 and 12 are similar in construction except that they are mounted on opposite sides of the center line of the apparatus to open in opposite directions to brush and clean both sides of the vehicle. Therefore, only the first brushing unit 11 will be described in detail.

Referring to FIGURES 1, 2, 4 and 5, the brushing unit 11 is comprised of a first or primary overhead arm 31 pivotally attached at the inner end to a frame member 22 of frame means 13 by a vertical pivot pin 32 forming a vertical axis. Arm 31 is comprised of a pair of spaced tubular members 33. Referring to FIGURE 1, it will be noted that pivot pin 32 mounts the arm 31 to the frame means 13 overhead at a point inside the path of the vehicle offset to one side of the center line 15. Pivotally attached to the opposite or outer end of arm 31 by means of vertical pivot pin 34 is a second overhead arm 35. A rotary brush 36 is carried by arm 35 at the end opposite to the end which is pivotally mounted to arm 31.

The means mounting the brush 36 at the end of arm 35 is comprised of a vertical tubular member 30 having a rotatable brush shaft 37 extending therethrough to form a vertical axis. Brush 36 is rotatably mounted at the bottom end of shaft 37 in the path of the vehicle. Brush 36 preferably is of the type having soft bristles which collapse as shown in solid lines in FIGURE 2 when the brush is not being rotated but which expand as shown in the dotted lines in FIGURE 2, when the brush is rotated.

As most clearly illustrated in FIGURE 5, a roller 42 is mounted for rotation at the top of tubular member 30 adjacent the end of arm 35 for contact with guide means 64 as will be explained more fully hereinafter. A sprocket 38 is mounted at the upper extremity of shaft 37 for engagement with a chain 39 connected to a second sprocket 40 rotatably driven by any suitable power means such as electric motor 41 mounted on arm 35 to rotate brush 36 in a direction which causes brush 36 to move left across the front, along the left side and across the back end of the vehicle.

As best shown in FIGURE 1, a horizontal beam member 47 is rigidly mounted to the frame means 13 offset to the left of pin 32 and extends horizontally outwardly therefrom in angular relationship to one of the frame members 22. A second beam member 48 similarly connected to the frame means extends horizontally outward therefrom to further rigidly secure beam member 47 to the frame means 13. Beam member 47 on its inside outer end is provided with a suitable limit stop means 49 for engagement with first arm 31 when the arm is in its normal or closed position. Arm 31 is maintained in its closed position by a weight tensioning means comprised of a cable 51 having suitable weights 52 attached thereto at one end. Cable 51 extends over a first pulley 53 mounted at the outside, outer end of beam member 47 and also over a second pulley 54 mounted to an upper corner of frame means 13 and down through tubular member 55 to the point where the weights 52 are attached to the bottom end of the cable.

A second biasing or tensioning means is connected between the first arm 31 and the second brush arm 35 to maintain arm 35 in its normally closed position abutting limit stop means 56 which is mounted on the inside of the first arm 31 as shown in FIGURE 1. The second tensioning means is preferably comprised of a cable 57 attached at one end to second arm 35 and extends over a pulley 58 mounted on the outside of arm 31 to connect with a spring 59 attached to the inner end of arm 31. As further shown in FIGURE 1, a third limit stop means 61 is mounted on arm 31 adjacent the outer outside end thereof to limit the maximum movement of arm 35 with respect to arm 31 when the arms have been moved to an open position.

Referring again to FIGURE 1, it will be noted that when the brush unit 11 is in its normally closed position, wherein the first arm 31 abuts against stop means 49, and the second arm 35 abuts against stop means 56, the two arms have an angle between them of less than 90°. In this position the first arm 31 extends angularly outwardly in a horizontal plane from the pin 32 on frame means 13 in a direction opposite to that in which the vehicle to be washed travels whereby the outer end of arm 31 is at the opposite side of center line 15 from the inner or frame pivoted end. In this normally closed position, arm 31 preferably forms an acute angle of substantially less than 90° with center line 15 as illustrated in FIGURE 1. In the normally closed position, the second arm 35 extends generally parallel to center line 15 and extends from the outer end of arm 31 inwardly toward the frame supporting means 13 in the direction of travel of the vehicle indicated by the arrow 16. It is to be noted that in this position, the shaft 37 mounting the brush 36 is at the opposite side of the center line 15 from pivot pin 32 mounting arm 31 to the frame means 13.

As previously noted, the biasing or tensioning means both function to maintain the arms in their closed position. The use of a separate biasing or tensioning means for each arm permits the brush unit to operate effectively and efficiently during a vehicle washing operation so that the brush 36 is continually maintained in contact with the vehicle as the vehicle passes through the washing apparatus.

A guide means 64 is mounted overhead on the frame means 13 in the path and ahead or forwardly of the brush unit 11 in the direction of travel of the vehicle indicated by arrow 16. In the embodiment shown, the guide means is comprised of a cable 64 attached at its inner end to the front of frame means 13 at a point adjacent the pivot pin 32 and extends angularly therefrom at an angle of approximately 45° in a horizontal plane to the frame members 22 of frame means 13 where it is rigidly secured. If desired, any suitable substitute for a cable such as a solid rod may be used. The cable 64 is adapted to be contacted by the roller 42 mounted on tubular member 36 at the end of arm 35 as the brush 36 of brush unit 11 is moved forwardly upon being contacted by a vehicle. Because of its angular relation, the guide means 64 functions to guide the brush outwardly to facilitate movement of the brush around the corner of the vehicle. Moreover, contact between the roller 42 and the guide means 64 causes the brush to be pushed with greater force against the front end of the vehicle to increase the torque of the brush against the front end of the vehicle and thus cause the brush to move more positively across and around the front corner of a vehicle.

As previously stated, the brush unit 12 is similar in construction to brush unit 11 except that it is mounted on the opposite side of the center line from brush unit 11 so that it functions to wash the opposite side of the vehicle. It is to be noted, however, that there are certain differences in the arrangement of the supporting structure to permit the brush unit 12 to open in the opposite direction from brush unit 11. Thus, beam member 65 extends diagonally between the upper frame member rather than extending outwardly from the frame means 13 as beam member 47 does. Beam member 65, however, functions in the same manner as beam member 47. In addition, the guide means comprised of the cable member 66 associated with brush means 12 extends angularly outwardly from a frame member 22 to be connected at its outer end to an extension 67 of frame means 13 rather than being connected between two top frame members 22 of the frame member 13. Again, however, guide means 66 functions in a manner identical to guide means 64.

The operation of the vehicle washing apparatus of the present invention is best understood by reference to FIGURES 4a through 4f. Beginning with FIGURE 4a, as the vehicle 14 contacts the brush 36 of the first brush unit 11, the brush 36 begins to move across the left front side of the vehicle. Because of the fact that the arms of brush unit 11 are mounted inside the path of the vehicle, the brush 36 when first contacted, has a tendency to ride for a longer period of time on the front portion of the vehicle thereby effecting a more satisfactory cleaning and washing operation.

Referring to FIGURE 4b, as the vehicle 14 continues through the washing mechanism, the roller 42 attached to brush unit 36 contacts a first guide means 64 to facilitate movement of the first brush 36 around the left front corner of the vehicle. Continued forward movement of the vehicle results in contact with the brush 36 of brush unit 12 which in turn causes the brush to begin its movement from the center of the vehicle across the front to the right hand corner of the vehicle. It is to be noted that the brushes of brush units 11 and 12 rotate in opposite directions as shown by the arrows on the drawings to facilitate movement of each brush in opposite directions around the vehicle.

Figure 4E:
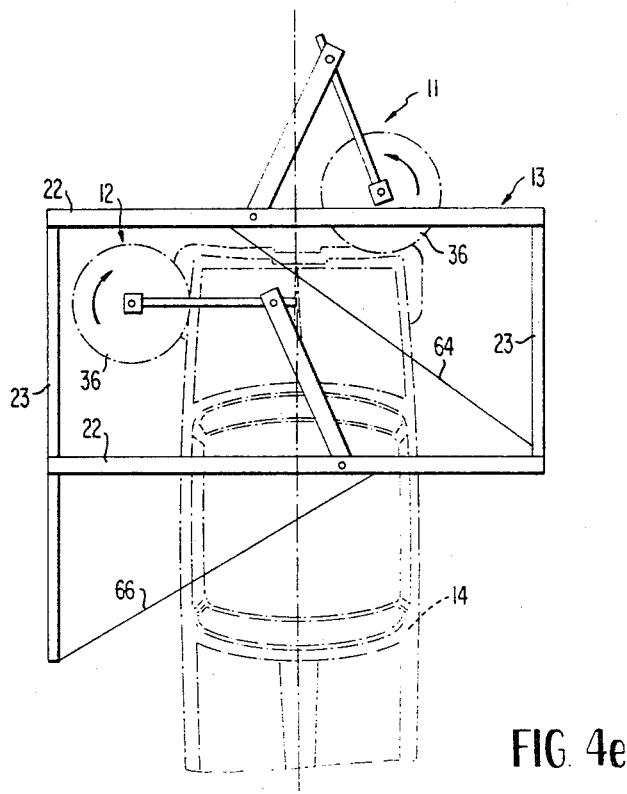
Figure 4F:
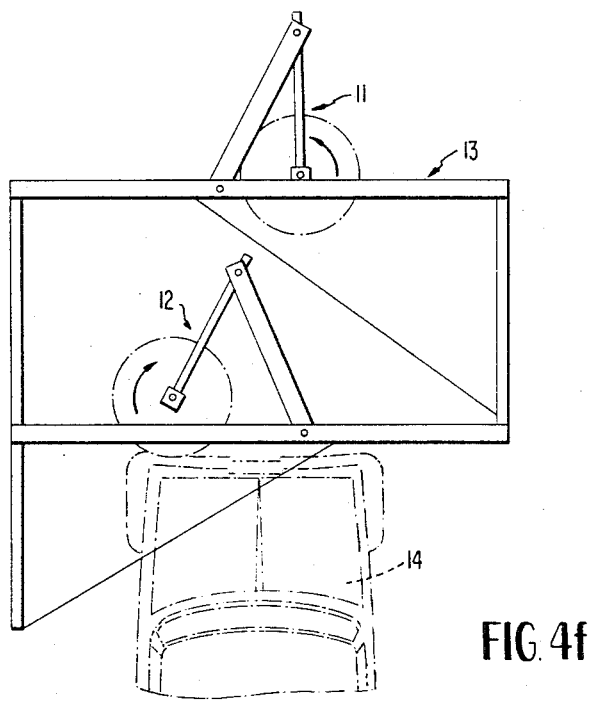

Referring to FIGURE 4c, it will be noted that after the brush of each unit rounds the corner of the vehicle, the brush units continue to move to their open positions wherein the brush of each unit is at the side of the vehicle. As the vehicle continues its movement through the washing apparatus, and the brushes move down along the sides thereof, the first arm of each brush unit tends to move to its normal position as illustrated in FIGURE 4c. In the positions of the brushes shown in solid lines in FIGURE 4c, the first arm 31 of each unit is in its normal starting position extending generally lengthwise of the path in a direction opposite to that in which the vehicle moves while the second arm 35 of each unit extends transversely of the path to form an angle greater than 90° with the first arm. When the vehicle is almost through the washing apparatus, the brush of the first unit 11 rounds te left back corner of the vehicle and continues to follow across the left back end of the vehicle as shown in FIGURES 4d and e until it has returned to its initial starting position as shown in FIGURE 4f. The biasing or tensioning means function to maintain the brush in contact with the vehicle at all times until the brushes return to their normal positions.

The advantages of the present invention are readily apparent, but will be summarized briefly. Because the brush units are mounted inside the path of the vehicle, better and more efficient contact is maintained with both the front and rear ends of the vehicle as it passes therethrough resulting in a better cleaning action. Moreover, the use of two tensioning means effectively maintains the brush in contact with the vehicle at all times. The guide means mounted ahead of each brush unit not only functions to guide each brush around the front corner of the vehicle, and therefore prevent snagging of the brush, but also acts to increase the pressure of the brush against the front of the vehicle. Moreover, it is clear that the unique and advantageous method of mounting each brush unit results in a simple and inexpensive unit which is easy to operate and requires a minimum of supervision and maintenance.

Although the present invention has been illustrated and described with reference to a specific embodiment, it will be understood that various modifications may be made by persons skilled in the art without departing from the spirit of the invention which is defined solely by the appended claims.

I claim:
1. A vehicle washing apparatus comprising
   supporting frame means extending over a predetermined path of a vehicle to be washed,
   a first arm pivotally mounted at one end to said frame means at a point overhead inside the path of the vehicle,
   a second arm pivotally connected at one end to the opposite end of said first arm,
   a rotatable brush,
   means mounting said brush at the opposite end of said second arm,
   means for rotating said brush,
   and biasing means normally maintaining said arms in a closed position to initially locate said brush in the path to be contacted by the vehicle, said arms being movable from said closed position to an open position as said brush is contacted by the vehicle to allow said brush to move across the front, along the side and across the back of the vehicle.

2. A vehicle washing apparatus according to claim 1 which includes guide means located in the path ahead of said brush for contact by said brush mounting means as said brush moves across the vehicle to facilitate movement of said brush around the front corner of the vehicle.

3. A vehicle washing apparatus according to claim 2 wherein said brush mounting means includes a roller for contacting said guide means.

4. A vehicle washing apparatus according to claim 1 wherein said biasing means includes a first tensioning means connected to said first arm and said frame means and a second spring tensioning means connected between said first arm and said second arm.

5. A vehicle washing apparatus according to claim 4 wherein said first tensioning means comprises a cable having a weight attached thereto and said second tensioning means comprises a spring tensioning means.

6. A vehicle washing apparatus according to claim 1 which includes limit stop means mounted on said frame means to normally maintain said first arm in said closed position.

7. A vehicle washing apparatus according to claim 1 wherein said first and said second arms are both located inside the path of the vehicle when said arms are in said closed position.

8. A vehicle washing apparatus according to claim 1 wherein the included angle between said arms when in said closed position is less than 90°.

9. A vehicle washing apparatus comprising
supporting frame means extending over a predetermined path of a vehicle to be washed,
a first arm pivotally mounted at one end to said frame means at a point overhead inside the path of the vehicle,
a second arm pivotally connected at one end to the opposite end of said first arm,
a rotatable brush,
means mounting said brush at the opposite end of said second arm,
means for rotating said brush,
biasing means normally maintaining said arms in a closed position to initially locate said brush in the path to be contacted by the vehicle, said arms both being located overhead inside the path of the vehicle when in said closed position, said arms being movable from said closed position to an open position as said brush is contacted by the vehicle to allow said brush to move across the front, along the side and across the back of the vehicle, and
guide means located in the path ahead of said brush in the direction of travel of the vehicle for contact by said brush mounting means to facilitate movement of said brush around the front corner of the vehicle.

References Cited

UNITED STATES PATENTS 3,310,824   3/1967   Beer.
3,350,733   11/1967  Hanna.

EDWARD L. ROBERTS, Primary Examiner